United States Patent
Mohaupt (10) Patent No.: US 10,256,532 B2
(45) Date of Patent: Apr. 9, 2019

(54) APPARATUS, METHOD, AND COMPUTER PROGRAM FOR A VEHICLE HAVING AT LEAST ONE INDOOR ANTENNA AND AT LEAST ONE EXTERNAL ANTENNA

(71) Applicant: VOLKSWAGEN AG, Wolfsburg (DE)

(72) Inventor: Matthias Mohaupt, Bochum (DE)

(73) Assignee: Volkswagen AG (DE)

( * ) Notice: Subject to any disclaimer, the term of this patent is extended or adjusted under 35 U.S.C. 154(b) by 183 days.

(21) Appl. No.: 15/299,680

(22) Filed: Oct. 21, 2016

(65) Prior Publication Data

US 2017/0117618 A1    Apr. 27, 2017

(30) Foreign Application Priority Data

Oct. 26, 2015   (EP) ..................................... 15191467

(51) Int. Cl.
  *H01Q 1/22*   (2006.01)
  *H01Q 1/32*   (2006.01)
  *H04B 1/3877* (2015.01)

(52) U.S. Cl.
  CPC ......... *H01Q 1/3275* (2013.01); *H01Q 1/2291* (2013.01); *H01Q 1/3291* (2013.01); *H04B 1/3877* (2013.01)

(58) Field of Classification Search
  CPC ... H01Q 1/3275; H01Q 1/3291; H04B 1/3877
  USPC ........................................... 455/550.1, 569.2
  See application file for complete search history.

(56) References Cited

U.S. PATENT DOCUMENTS

| | | | | |
|---|---|---|---|---|
| 2001/0041541 | A1* | 11/2001 | Nokkonen | H01Q 1/242 455/83 |
| 2003/0193388 | A1* | 10/2003 | Ghabra | B60R 25/24 340/5.61 |
| 2005/0227612 | A1 | 10/2005 | Helstrom et al. | |
| 2006/0079275 | A1* | 4/2006 | Ella | H04B 1/006 455/553.1 |
| 2014/0171000 | A1 | 6/2014 | Kuo | |
| 2014/0357311 | A1* | 12/2014 | Suzuki | H04W 52/04 455/522 |

OTHER PUBLICATIONS

Search Report for European Patent Application No. 15191467.8; dated May 10, 2016.

* cited by examiner

*Primary Examiner* — Ayodeji O Ayotunde (74) *Attorney, Agent, or Firm* — Barnes & Thornburg LLP (57) ABSTRACT

An apparatus, a method, and a computer program for a vehicle having at least one interior antenna and at least one exterior antenna. The apparatus includes a transceiver module for communication via a frequency band and a control module to control the transceiver module. The control module provides signal processing for the transceiver module for signals from the at least one interior antenna and the at least one exterior antenna based on a combination of the signals from the at least one interior antenna and the at least one exterior antenna.

28 Claims, 9 Drawing Sheets

APPARATUS, METHOD, AND COMPUTER PROGRAM FOR A VEHICLE HAVING AT LEAST ONE INDOOR ANTENNA AND AT LEAST ONE EXTERNAL ANTENNA

PRIORITY CLAIM

This patent application claims priority to European Patent Application No. 15191467.8, filed 26 Oct. 2015, the disclosure of which is incorporated herein by reference in its entirety.

SUMMARY

Illustrative embodiments relate to an apparatus, a method, and a computer program for a vehicle having at least one interior antenna and at least one exterior antenna for providing signal processing for a transceiver module based on a combination of signals from the at least one interior antenna and the at least one exterior antenna.

BRIEF DESCRIPTION OF THE DRAWINGS

Disclosed embodiments are described in more detail below with reference to the drawings, there being no general restriction to the exemplary embodiments overall, however. In the drawings.

DETAILED DESCRIPTION

Networking of vehicles is increasingly adopting a central position in vehicle construction. Both networking of vehicles to the outside, e.g., in a vehicle-to-vehicle communication network or as networking to a workshop or for piloted parking, and networking to the inside, for example, to provide vehicle occupants with access to entertainment functions of the vehicle or to provide Internet access, are some of the functions frequently requested in new vehicles.

More and more vehicles are provided with vapor deposition for the vehicle windows to reduce a heating action by insolation on the vehicle. However, vapor deposition for the windows simultaneously leads to attenuation of electromagnetic signals, for example, of radio signals, as are used to network the vehicles.

There is a need to provide an improved concept for a transceiver unit for a vehicle that takes into consideration both interior and exterior communication, for example, in the event of increased attenuation on account of evaporation-treated vehicle windows.

This need is reflected by the apparatus, the method and the computer program according to the independent claims.

Disclosed embodiments provide an apparatus, a method and a computer program for a vehicle having at least one interior antenna and at least one exterior antenna. The apparatus comprises a transceiver module and a control module, wherein the control module is designed to provide signal processing for the transceiver module. In this case, the signal processing is based on a combination of signals from the at least one exterior antenna and the at least one interior antenna. By way of example, the control module can provide maximum ratio combining for the signals, that is to say can increase the signal-to-noise ratio, for example, by adding useful signals and only randomly overlaying the interference signals, or it can provide the stronger signal component of a signal for the transceiver module, for example, that is to say can make a selection of the signal components from the different signal sources. The transceiver module can then take the signal processing as a basis for increasing reception quality, for example, without additional reception modules being needed for the different antennas.

Exemplary embodiments provide an apparatus for a vehicle. The vehicle further comprises at least one interior antenna and at least one exterior antenna. The apparatus comprises a transceiver module for communication via a frequency band. The apparatus further comprises a control module designed to control the transceiver module. The control module is further designed to provide signal processing for the transceiver module for signals from the at least one interior antenna and the at least one exterior antenna. The signal processing is based on a combination of the signals from the at least one interior antenna and the at least one exterior antenna. In this case, exemplary embodiments can allow a higher signal-to-noise ratio at the receiver. Further, exemplary embodiments can allow use of interior and exterior antennas with the same transceiver unit. This can double an availability of the communication on the antennas, for example, since both interior and exterior antennas can be used at the same time.

In some exemplary embodiments, the apparatus may comprise a further transceiver module for communication via a further frequency band, which is different than the frequency band of the transceiver module. The control module may further be designed to provide further signal processing for the further transceiver module for signals from the at least one interior antenna and the at least one exterior antenna based on a combination of the signals from the at least one interior antenna and the at least one exterior antenna. Use of a further transceiver module for communication via a further frequency band can further increase an availability of the communication and allow communication in multiple frequency bands at the same time. The provision of the signal processing can allow both transceiver modules to communicate on the interior and exterior antennas, for example, both on the inside and on the outside at the same time, or one transceiver module on the inside and one transceiver module on the outside.

In some exemplary embodiments, the apparatus may further comprise at least one diplexer that is designed to separate frequency components of the frequency band and of the further frequency band for the signal processing of the signals. The at least one diplexer can allow separation of the signal components of the different frequency bands.

In some exemplary embodiments, the control module is designed to provide the signal processing as maximum ratio combining. The maximum ratio combining can increase a signal-to-noise ratio, for example, by virtue of useful components of the signals being added and noise components of the signals being merely randomly overlaid on one another. Alternatively or additionally the control module may be designed to provide the signal processing as selection of the stronger signal of the signals from the at least one interior antenna and the at least one exterior antenna. The use of the combination as selections can allow both antennas to be used for reception at the same time without needing a further reception module.

In some exemplary embodiments, the apparatus may further comprise one or more matched filters for filtering the signals prior to the signal processing. The matched filters can be used to increase a signal-to-noise ratio, and allow maximum ratio combining, for example.

In some exemplary embodiments, the one or more matched filters may comprise at least one element from the group comprising signal-matched filter, channel-matched filter and signal- and channel-matched filter. The matched filters can be used to increase a signal-to-noise ratio, and allow maximum ratio combining, for example.

In at least some exemplary embodiments, the signal processing can be based on autocorrelation functions of the signals. The autocorrelation functions can be used to boost a useful signal that the signals comprise and to increase a signal-to-noise ratio.

In some exemplary embodiments, the transceiver module may be designed to communicate via the interior antenna and via the exterior antenna at the same time. This can increase an availability of the communication on the interior and exterior antennas.

In at least some exemplary embodiments, the control module may be designed to determine a useful signal from a communication partner in the received signals. The control module may be designed to determine whether a signal component of the useful signal from the interior antenna or a signal component of the useful signal from the exterior antenna is predominant. The control module may further be designed to take the signal components as a basis for providing an output signal for the communication partner via the transceiver module via the interior antenna or the exterior antenna. This can allow radio resources to be separated locally and an available transmission capacity to be increased. Furthermore, it can allow signals to be provided on the antenna via which the receiver receives the signals better.

In some exemplary embodiments, the control module may be designed to use the transceiver module to form a rake receiver. The rake receiver can be used to boost a useful signal that the signals comprise and to increase a signal-to-noise ratio.

Exemplary embodiments further provide a method for a vehicle. The vehicle comprises at least one interior antenna and at least one exterior antenna. The method comprises a combination of the signals from the at least one interior antenna and the at least one exterior antenna. The method further comprises processing of the combination of the signals from the at least one interior antenna and the at least one exterior antenna.

Exemplary embodiments further provide a program having a program code for performing the method when the program code is executed on a computer, a processor, a control module or a programmable hardware component.

Different exemplary embodiments are now described in more detail with reference to the accompanying drawings, which represent some exemplary embodiments. In the figures, the thickness dimensions of lines, layers and/or regions may be represented in an exaggerated state for the sake of clarity.

In the description that follows for the appended figures, which show just some exemplary embodiments, the same reference symbols can denote components that are the same or comparable. Further, synoptic reference symbols can be used for components and objects that arise repeatedly in an exemplary embodiment or in a drawing but are described together for one or more features. Components or objects that are described using the same or synoptic reference symbols may be embodied in the same way, but if need be also differently, in terms of individual, multiple or all features, for example, their dimensions, unless the description explicitly or implicitly reveals anything different.

Although exemplary embodiments can be modified and altered in different ways, exemplary embodiments are represented as examples in the figures and are described in detail here. However, it should be clarified that the intention is not for exemplary embodiments to be limited to the respectively disclosed forms, but rather for exemplary embodiments to cover all functional and/or structural modifications, equivalents and alternatives that are within the realm of the disclosed embodiments. The same reference symbols denote elements that are the same or similar throughout the description of the figures.

It should be noted that an element that is referred to as "connected" or "coupled" to another element may be connected or coupled to the other element directly or that there may be intermediate elements. When an element is referred to as "directly connected" or "directly coupled" to another element, on the other hand, there are no intermediate elements. Other terms that are used to describe the relationship between elements should be interpreted similarly (e.g., "between" as opposed to "directly between", "adjoining" as opposed to "directly adjoining" etc.).

The terminology that is used herein serves only to describe particular exemplary embodiments and is not intended to limit the exemplary embodiments. As used herein, the singular forms "a" and "the" are also intended to include plural forms unless the context explicitly indicates otherwise. Further, it should be clarified that expressions such as, e.g., "includes", "including", "has", "comprises", "comprising" and/or "having", as used herein, indicate the presence of the features, whole numbers, operations, workflows, elements and/or components but do not exclude the presence or the addition of one or more feature(s), whole number(s), operation(s), workflow(s), element(s), component(s) and/or group(s) thereof.

Unless stated otherwise, all terms used herein (including technical and scientific terms) have the same meaning as attributed to them by an average person skilled in the art in the field to which the exemplary embodiments belong. Further, it should be clarified that expressions, e.g., those that are defined in generally used dictionaries, are to be interpreted as though they had the meaning that is consistent with their meaning in the context of the relevant art, and are not to be interpreted in any idealized or excessively formal sense, unless this is expressly defined herein.

Future automobile generations will probably have more and more windows treated with vapor deposition that are intended to reduce insolation into the vehicle interior. A side effect is increased attenuation of electromagnetic radiation. The result is a poorer radio link from the vehicle interior to the outside. This leads to impairment of the transmission quality, lower data rates or even complete breakdown of the radio link.

For this reason, a connection via an external WLAN antenna for an information unit of the vehicle is desirable. Since the connection can be set up not necessarily to the vehicle exterior but also in the interior (e.g., a mobile access point, also called a mobile hotspot of a smartphone), however, a connection in the interior at the same time may be necessary. In this case, it may be unknown whether the hotspot is inside or outside the vehicle.

Figure 2:
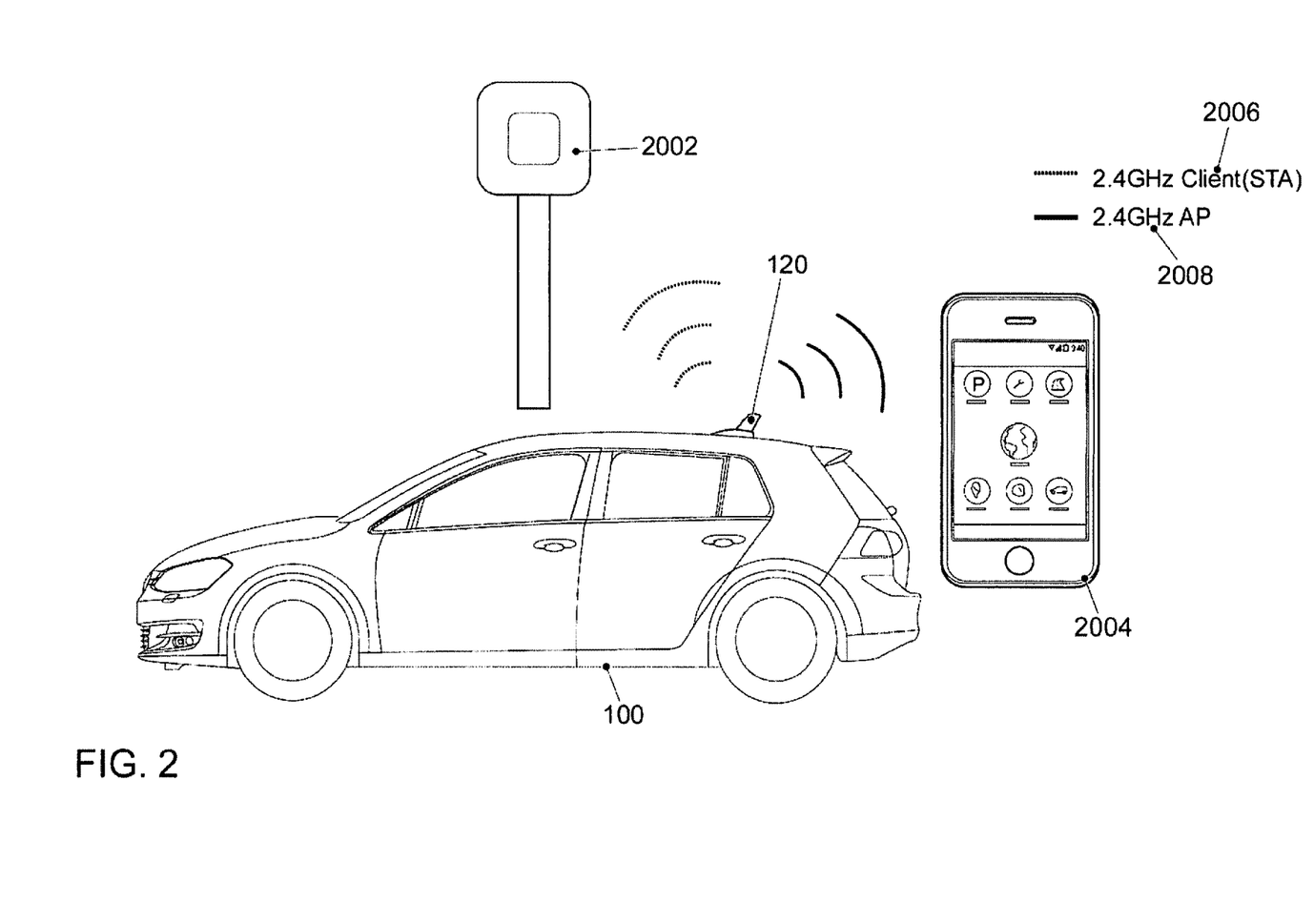
FIG. 2 shows a block diagram of a possible field of application for an exterior antenna.

FIG. 2 shows a possible field of application. By way of example, a vehicle 100 can use an exterior antenna 120 to connect to an external access point 2002, for example, as a client (user) in a 2.4 GHz frequency band 2006, or it could provide an access point in the 2.4 GHz frequency band 2008 for a mobile terminal 2004, for example, for piloted parking, for example, for transmitting camera data.

Figure 3:
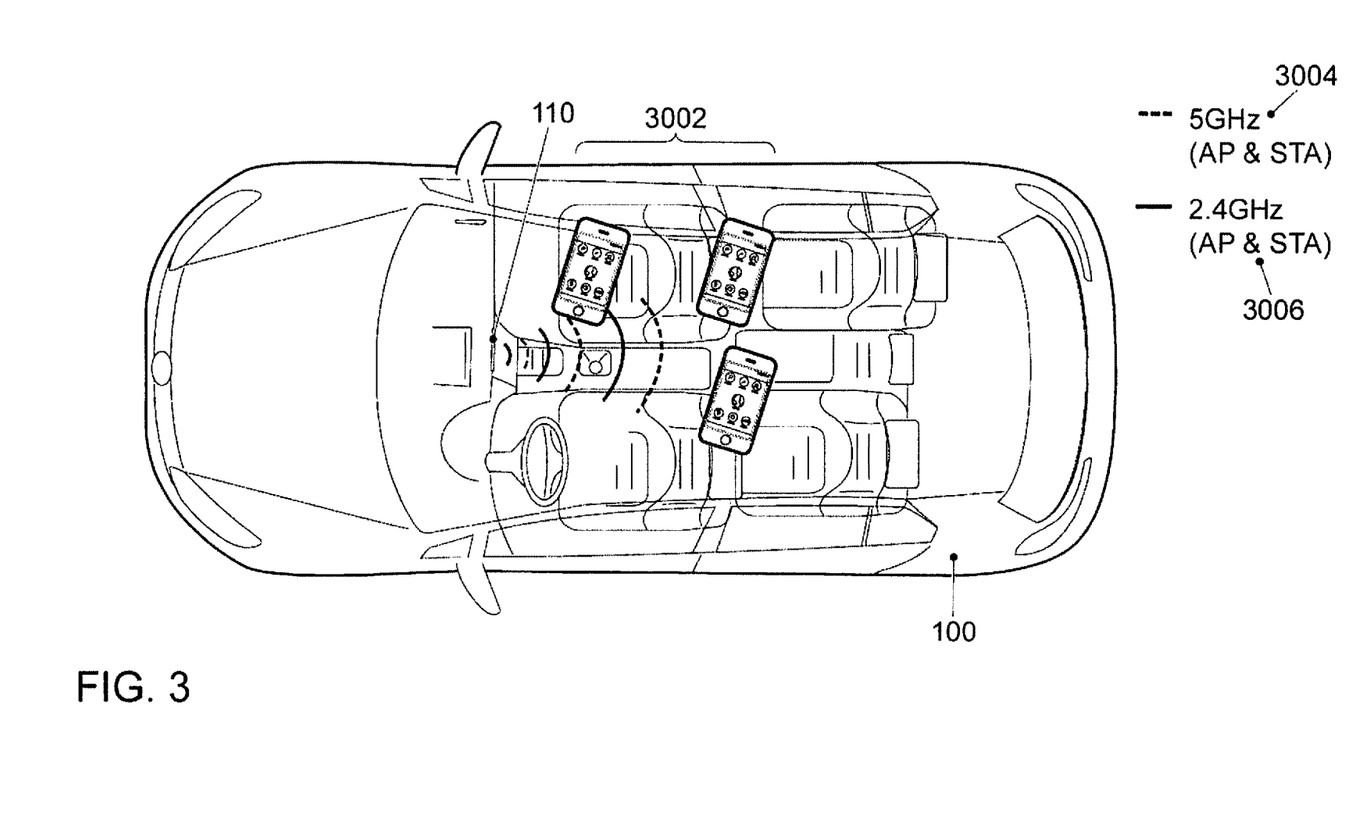
FIG. 3 shows a block diagram of a possible field of application for an interior antenna.

FIG. 3 shows an exemplary coverage via an interior antenna 110, for example, as an access point for mobile terminals 3002 in the vehicle interior, or by means of the use of a mobile access point of a mobile terminal (also called mobile hotspot) by the vehicle, to connect the vehicle 100 to a mobile communication network. In this case, a 5 GHz frequency band 3004 or a 2.4 GHz frequency band 3006 could be used, for example.

Figure 4:
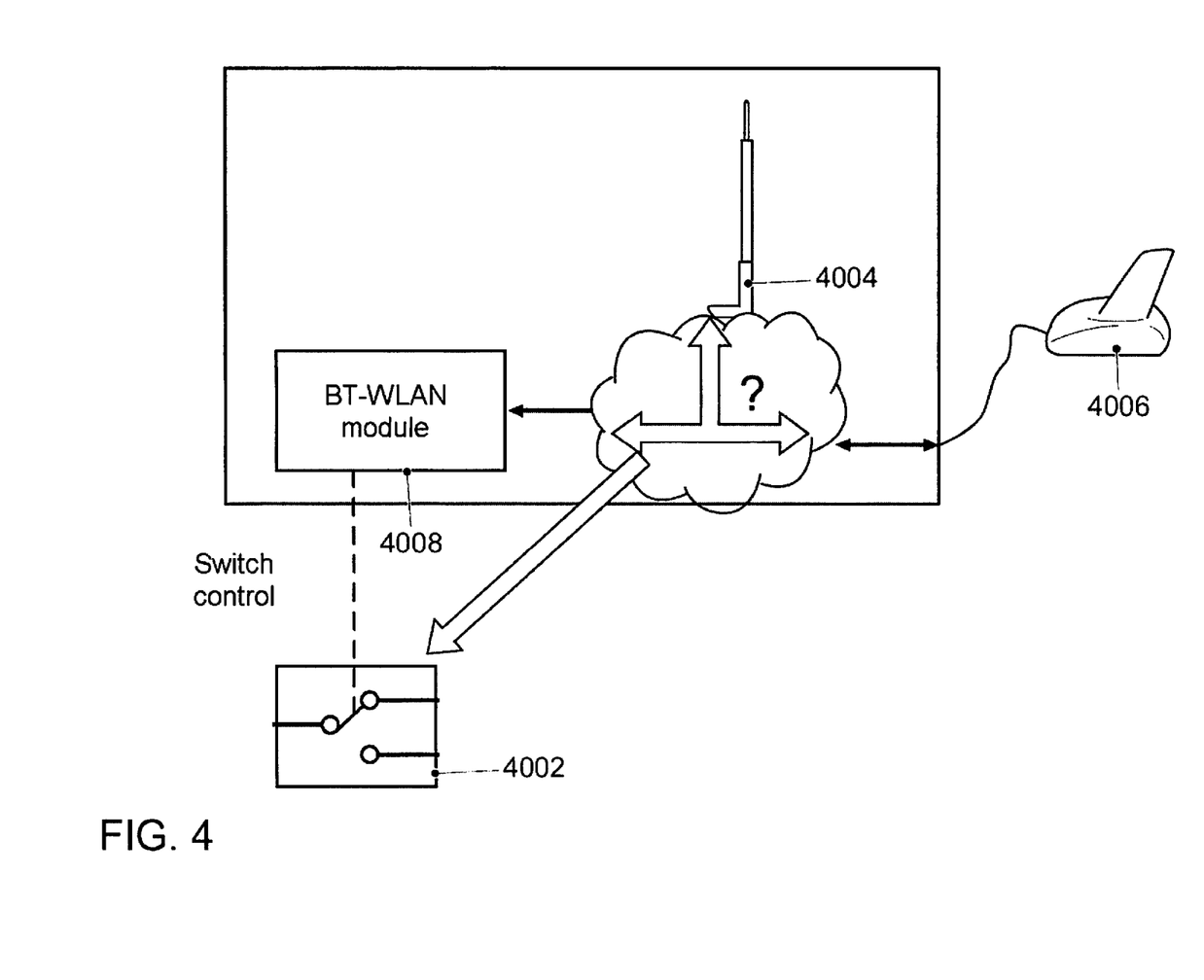
FIG. 4 shows a conventional system having a switch.

FIG. 4 shows a conventional solution. A switch 4002 can influence the use of an interior antenna 4004 or an exterior antenna 4006 by a transceiver module 4008, for example, a combined Bluetooth short-range radio and wireless local area access network (also called wireless local access network, WLAN) transceiver module. The switch can prompt static changeover between the interior and exterior antennas 4004; 4006, or the switch can be controlled dynamically and allow the use of the interior or exterior antenna 4004; 4006 on the basis of the position of the remote station.

Figure 4A:
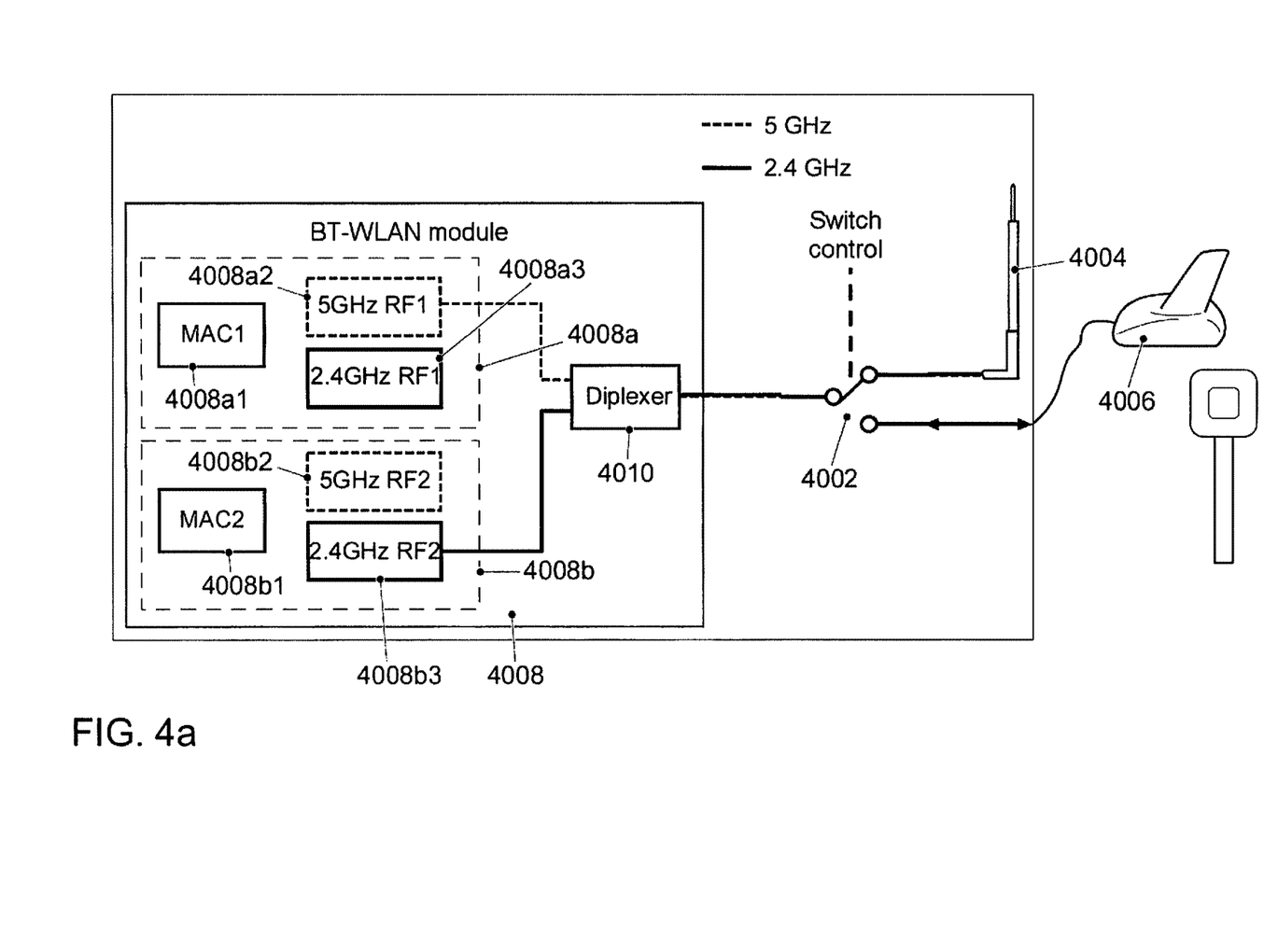
FIG. 4a shows a block diagram of the conventional system having the switch.

FIG. 4a shows a block diagram of the conventional solution by way of example. The transceiver module 4008 comprises a first submodule 4008a that is designed to communicate in a 5 GHz frequency band and a second submodule 4008b that is designed to communicate in a 2.4 GHz frequency band. The submodules comprise media access control (MAC) modules 4008a1; 4008b1 and transceiver components for the 5 GHz frequency band 4008a2; 4008b2 and for the 2.4 GHz frequency band 4008a3; 4008b3. A diplexer 4010 splits the frequency band components in the received signals. The switch 4002 is coupled to the diplexer 4010 and to the interior antenna 4004 and the exterior antenna 4006 and provides the signal from the interior antenna 4004 or exterior antenna 4006 for the diplexer. In an exemplary scenario, it is unknown whether a hotspot to which an information unit of a vehicle wishes to connect is situated in the vehicle interior or outside. In the conventional solution, the information unit changes over between the interior antenna 4004 and the exterior antenna 4006 to analyze the radio space. As a result, as seen over time, for example, the bandwidth or transmission capacity in the frequency band used can be halved. This can have an adverse effect on transmissions with a large data volume, for example.

Furthermore, when multiband antennas are used, both bands can frequently be switched only at the same time. When the information unit connects to an external 2.4 GHz hotspot, the 5 GHz access point may also not be provided in the vehicle during this time, which means that, as seen over time, the bandwidth can likewise halve.

Figure 5A:
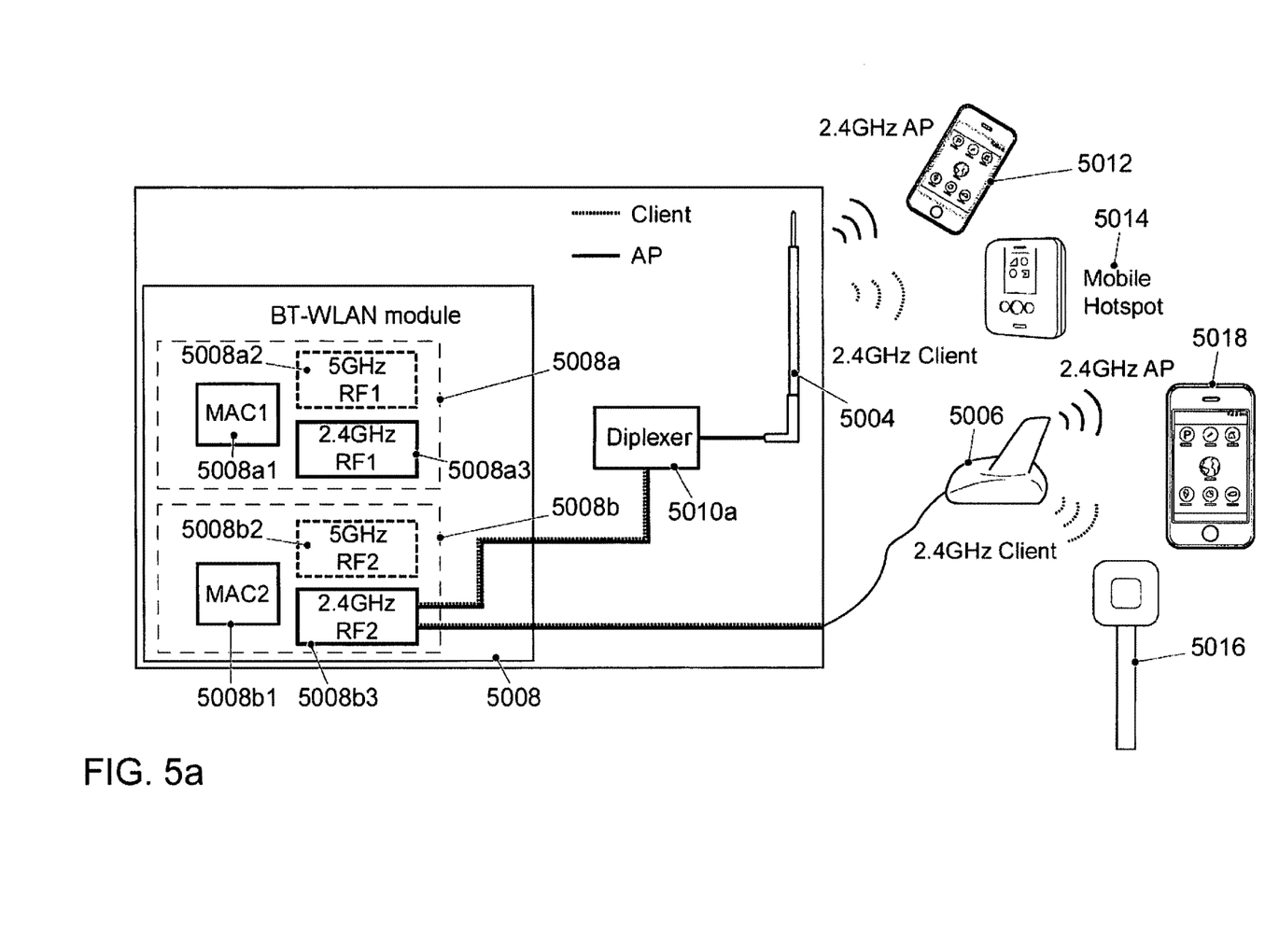
FIG. 5a shows a block diagram of an exemplary embodiment without a switch.

FIG. 5a shows a block diagram of an exemplary embodiment without a switch. FIG. 5a shows a transceiver module 5008 having a first submodule 5008a and a second submodule 5008b. The submodules comprise media access control modules 5008a1; 5008b1, and transceiver components for the 5 GHz frequency band 5008a2; 5008b2 and for the 2.4 GHz frequency band 5008a3; 5008b3. FIG. 5a further shows a diplexer 5010a and an interior antenna 5004 and an exterior antenna 5006. FIG. 5a shows a communication using just one frequency band (2.4 GHz) by way of example. Signal processing for a combination of the signals can be used by the second submodule 5008b, in some exemplary embodiments, to communicate based on signals from the interior antenna 5004 and the exterior antenna 5006 at the same time. The interior antenna can be used by the transceiver module 5008 to provide an access point for a mobile terminal 5012, for example, or, as a user, to use a mobile access point 5014 as a connection to a mobile communication network. The exterior antenna 5006 can be used by the transceiver module 5008 to connect to an access point 5016, for example, or to provide an access point for a mobile terminal 5018, for example, for piloted parking.

Use and processing of a combination of the signals (for example, by means of maximum ratio combining) allow the switch to be dispensed with. By way of example, in some exemplary embodiments, internal and external antennas can be connected simultaneously. As a result, in some exemplary embodiments, equally good coverage of interior and exterior can be achieved. When two transceiver units are used, it is possible to switch to and fro between use of the transceiver units as a user and use as an access point for the respective band, for example. The other band may be inactive, for example, at this time.

Figure 5B:
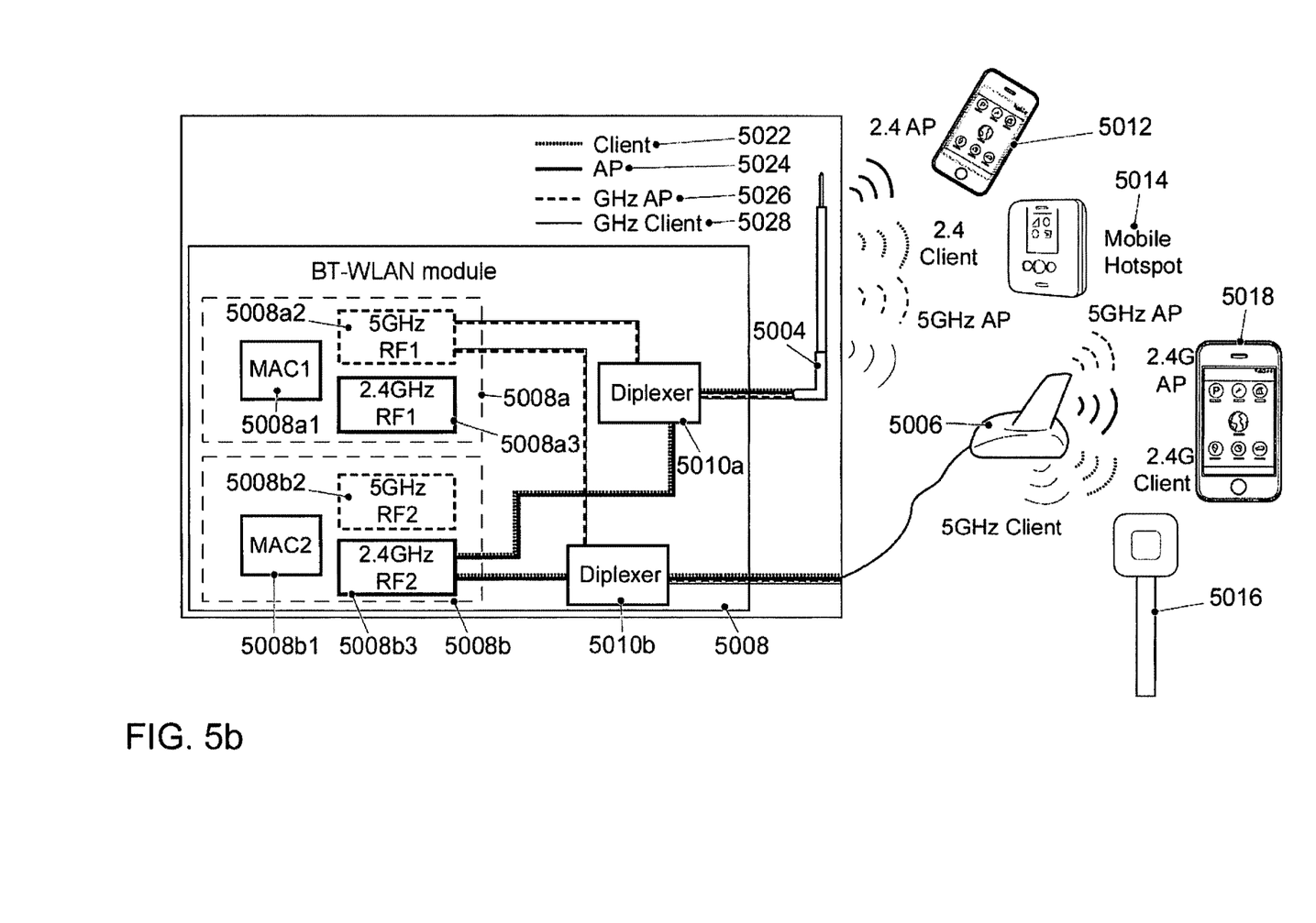
FIG. 5b shows an extension to the block diagram of the exemplary embodiment without a switch.

FIG. 5b shows an extension to FIG. 5a, which also shows, by way of example, the paths for simultaneous operation of the 2.4 GHz and 5 GHz bands, and a second diplexer 5010b for the exterior antenna. The different dashed paths show the signal components 2.4 GHz as user 5022, 2.4 GHz as access point 5024, 5 GHz as access point 5026 and 5 GHz as user 5028.

Figure 1:
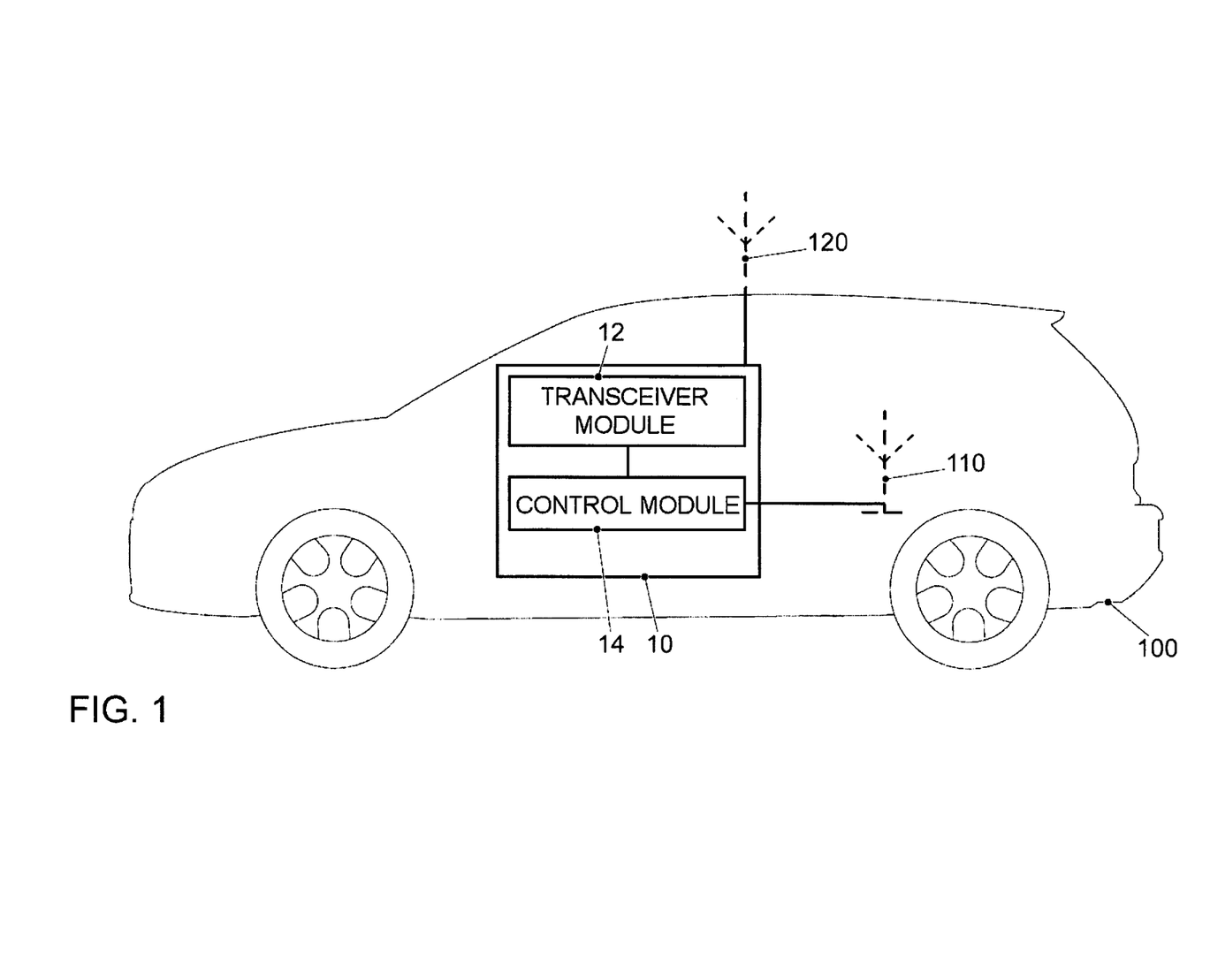
FIG. 1 illustrates a block diagram of an exemplary embodiment of an apparatus for a vehicle.

FIG. 1 illustrates a block diagram of an exemplary embodiment of an apparatus 10 for a vehicle 100. The vehicle 100 further comprises at least one interior antenna 110 and at least one exterior antenna 120.

In at least some exemplary embodiments, the vehicle 100 may correspond to a land vehicle, a watercraft, an aircraft, a rail vehicle, a road vehicle, an automobile, a 4×4, a motor vehicle or a truck, for example. The exterior antenna 120 may correspond to an antenna module that is mounted on the vehicle such that it allows communication with remote stations outside the vehicle, for example. The exterior antenna 120 may be mounted outside a Faraday cage of the vehicle, for example. The exterior antenna 120 may be designed to receive radio signals from remote stations that are situated outside the vehicle 100, for example. The exterior antenna 120 may correspond to a roof antenna of the vehicle 100, for example. The interior antenna 110 may correspond to an antenna module that is mounted inside the vehicle 100 such that it allows communication with remote stations inside the vehicle, for example. The interior antenna 110 may be mounted inside a Faraday cage of the vehicle, for example. The interior antenna 110 may be designed to receive radio signals from remote stations that are situated inside the vehicle 100, for example. The interior antenna 110 may correspond to an interior antenna module of an information unit of the vehicle 100, for example. The interior antenna 110 may correspond to the interior antenna 5004, for example, the exterior antenna 120 may correspond to the exterior antenna 5006, for example, and the transceiver module 5008 may correspond to the apparatus 10, for example.

Figure 1A:
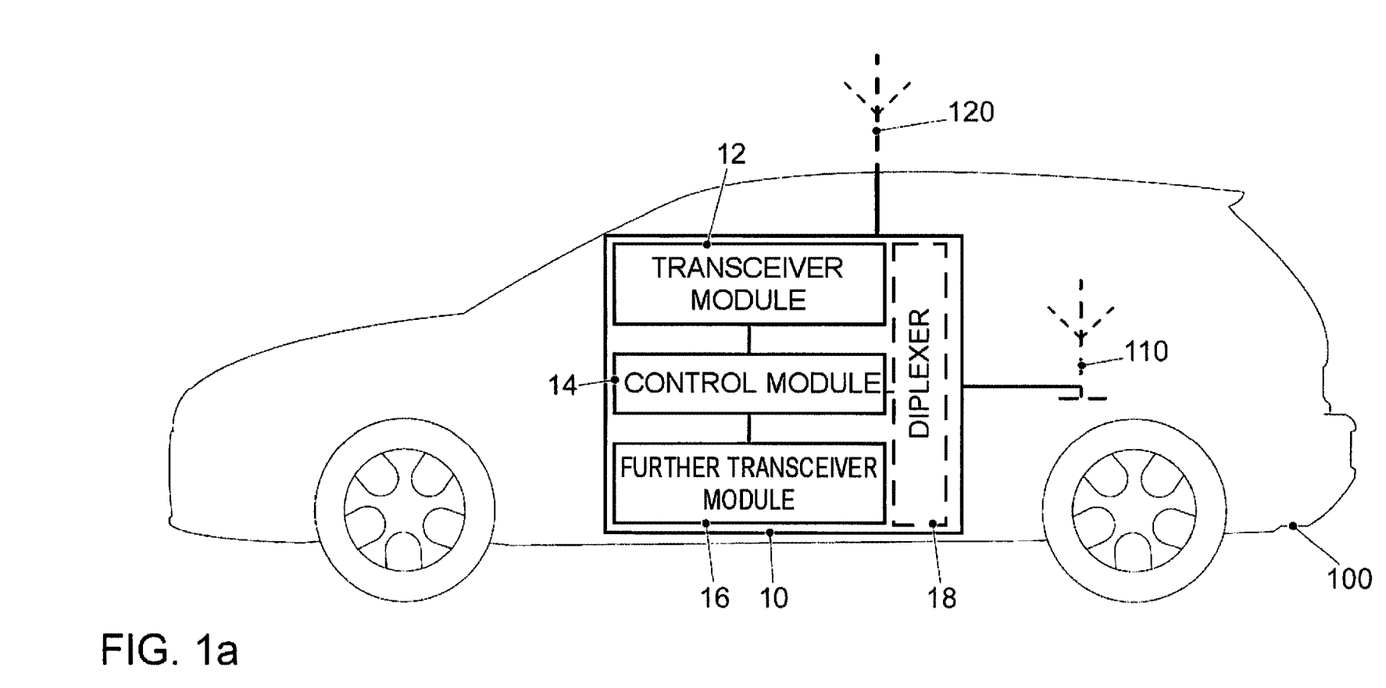
FIG. 1a illustrates a block diagram of a further exemplary embodiment of the apparatus, further comprising a further transceiver module.

The apparatus 10 comprises a transceiver module 12 for communication via a frequency band. In exemplary embodiments, the transceiver module 12, and an optional further transceiver module 16 from FIG. 1a, may contain typical transmitter and receiver components. By way of example, these may include one or more filters, one or more mixers, one or more amplifiers, one or more diplexers, one or more duplexers, etc. By way of example, the frequency band, and an optional further frequency band from FIG. 1a is introduced, may correspond to a frequency band of a mobile communication system, for example, a 2.4 GHz, 5 GHz or 5.9 GHz frequency band of a mobile communication system according to IEEE (Institute of Electrical and Electronics Engineers) standard 802.11, or to a frequency band of a 3GPP (3rd Generation Partnership Project) mobile communication system, for example, Universal Mobile Telecommunication System (UMTS), Long Term Evolution (LTE), or of a 5th generation mobile communication system, or to a frequency band of a microwave-based mobile communication system. The transceiver module 12 and/or the optional transceiver module 16 may accordingly be designed to communicate in a mobile communication system according to IEEE standard 802.11, Bluetooth, and/or in one of the aforementioned 3GPP mobile communication systems. In at least some exemplary embodiments, the transceiver module 12 and/or the further transceiver module 16 may be designed to communicate via the interior antenna 110 and via the exterior antenna 120 at the same time. The transceiver module 12 may correspond to the first submodule 5008a, for example, and the further transceiver module 16 may correspond to the second submodule 5008b, for example.

The apparatus comprises a control module 14 designed to control the transceiver module 12. The control module 14 is further designed to provide signal processing for the transceiver module 12 for signals from the at least one interior antenna 110 and the at least one exterior antenna 120 based on a combination of the signals from the at least one interior antenna 110 and the at least one exterior antenna 120.

In exemplary embodiments, the control module 14 may correspond to an arbitrary controller or a processor or to a programmable hardware component. By way of example, the control module 14 may also be provided as software that is programmed for a corresponding hardware component. In this respect, the control module 14 may be implemented as programmable hardware with appropriately matched software. In this case, arbitrary processors, such as digital signal processors (DSPs), can be used. Exemplary embodiments are not restricted to one particular type of processor in this case. Arbitrary processors or multiple processors are conceivable for implementing the control module 14. The transceiver module 12 and the optional further transceiver module 16 are coupled to the control module 14. The interior antenna 110 and the exterior antenna 120 are further coupled to the apparatus 10.

FIG. 1a illustrates a block diagram of a further exemplary embodiment of the apparatus 10, further comprising the further transceiver module 16 for communication via the further frequency band, which is different than the frequency band of the transceiver module 12. The control module 14 may further be designed to provide further signal processing for the further transceiver module 16 for signals from the at least one interior antenna 110 and the at least one exterior antenna 120 based on a combination of the signals from the at least one interior antenna 110 and the at least one exterior antenna 120. In some exemplary embodiments, the apparatus 10 may further optionally comprise at least one diplexer 18 designed to separate frequency components of the frequency band and of the further frequency band for the signal processing of the signals. By way of example, the at least one diplexer 18 may be designed to provide frequency domain multiplexing for the signals from the interior antenna 110 and/or the exterior antenna 120 and to provide the transceiver module 12 and/or the transceiver module 16 with signal components at the frequency band used by these.

In at least some exemplary embodiments, the control module 14 may be designed to provide the signal processing as maximum ratio combining. By way of example, the control module 14 may be designed to add a useful signal component that the signals from the at least one interior antenna 110 and the at least one exterior antenna 120 comprise and to randomly overlay a noise component in the signals. The control module 14 may further be designed to match a gain of the signal components of the signals from the at least one interior antenna 110 and the at least one exterior antenna 120 based on a root mean square of the signal levels. In some exemplary embodiments, the apparatus 10 may further comprise one or more matched filters for filtering the signals prior to the signal processing. The control module 14 may be designed to provide the maximum ratio combining based on the one or more matched filters. By way of example, the one or more matched filters may comprise at least one element from the group comprising signal-matched filter, channel-matched filter and signal- and channel-matched filter. The control module 14 may further be designed to provide the signal processing based on autocorrelation functions of the signals. By way of example, the control module 14 may be designed to provide the maximum ratio combining based on autocorrelation functions of the signals from the at least one interior antenna 110 and the at least one exterior antenna 120.

Alternatively or additionally, the control module 14 may be designed to provide the signal processing as selection of the stronger signal of the signals from the at least one interior antenna 110 and the at least one exterior antenna 120. By way of example, the control module 14 may be designed to make the selection of the stronger signal based on a continual comparison of the signal strengths (also called selection combining). Alternatively, the control module 14 may be designed to make the selection of the stronger signal when a currently selected signal falls below a threshold value (also called scanning/switched combining). In at least some exemplary embodiments, the control module 14 may be designed to make the selection based on a signal level of the signals and/or based on a signal-to-noise ratio of the signals.

In at least some exemplary embodiments, the control module 14 may be designed to use the transceiver module 12 to form a rake receiver. By way of example, the control module 14 may be designed to receive time-staggered signal components of a useful signal in the signals from the at least one interior antenna 110 and the at least one exterior antenna 120 and to provide the signal processing based on the time-staggered signal components, for example, to process signals that have been received via a multipath propagation. By way of example, the control module 14 may be designed to provide the signal processing for the time-staggered signal components based on correlation functions.

In at least some exemplary embodiments, the control module 14 may be designed to determine a useful signal from a communication partner in the received signals. By way of example, the control module 14 may be designed to distinguish between useful signals or useful signal components from different communication partners. The control module 14 may further be designed to determine whether a signal component of the useful signal from the interior antenna 110 or a signal component of the useful signal from the exterior antenna 120 is predominant. By way of example, the control module 14 may be designed to distinguish whether the interior antenna 110 or the exterior antenna 120 is used to receive a useful signal having a higher signal level and/or signal-to-noise ratio. The control module 14 may further be designed to take the signal components as a basis for providing an output signal for the communication partner via the transceiver module 12 via the interior antenna 110 or the exterior antenna 120. By way of example, the transceiver module 12 may be designed to transmit signals via the interior antenna 110, the exterior antenna 120 or both antennas in a transmission unit of the transceiver module 12. The control module 14 may be designed to control the transceiver module 12 such that the transmission unit provides the output signal on the antenna whose signal component in the received signal has the higher signal level and/or signal-to-noise ratio.

Figure 6:
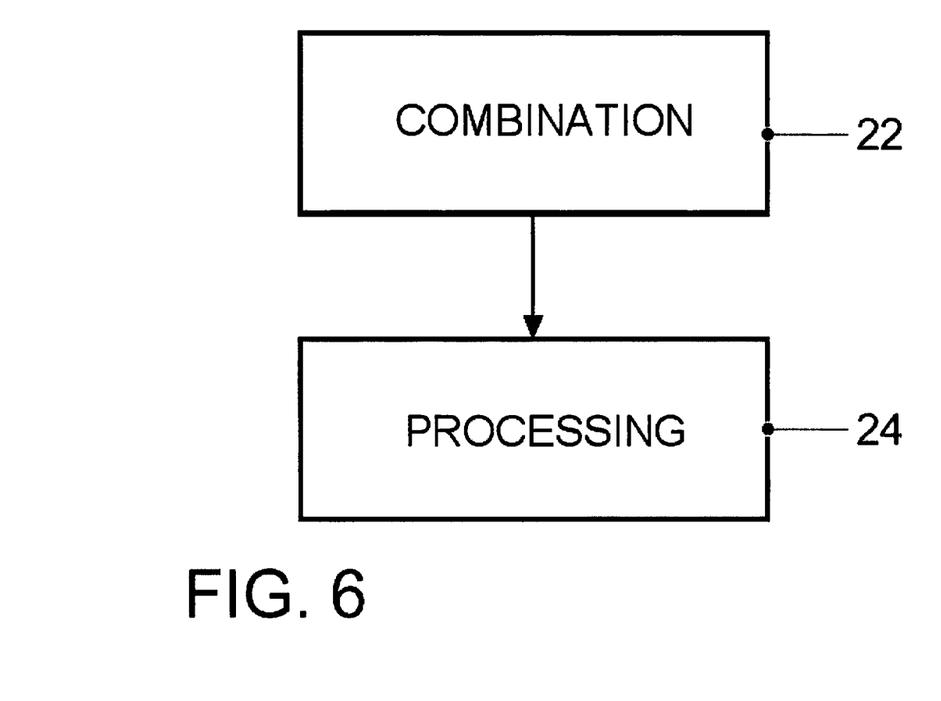
FIG. 6 illustrates a flowchart of an exemplary embodiment of a method for a vehicle.

FIG. 6 illustrates a flowchart of an exemplary embodiment of a method for a vehicle 100. The vehicle 100 comprises at least one interior antenna 110 and at least one exterior antenna 120. The method comprises combination 22 of the signals from the at least one interior antenna 110 and the at least one exterior antenna 120. The method further comprises processing 24 of the combination of the signals from the at least one interior antenna 110 and the at least one exterior antenna 120.

A further exemplary embodiment is a computer program for performing at least one of the methods described above when the computer program runs on a computer, a processor or a programmable hardware component. A further exemplary embodiment is also a digital storage medium that is machine- or computer-readable and that has electronically readable control signals that can interact with a programmable hardware component such that one of the methods described above is performed.

The features disclosed in the description above, the claims below and the appended figures may be significant and implemented either individually or in any combination for realizing an exemplary embodiment in their different refinements.

Although some embodiments have been described in connection with an apparatus, it goes without saying that these embodiments are also a description of the corresponding method, which means that a block or a component of an apparatus is also intended to be understood as a corresponding method operation or as a feature of a method operation. Similarly, embodiments that have been described in connection with or as a method operation are also a description of a corresponding block or detail or feature of a corresponding apparatus.

Depending on particular implementation requirements, exemplary embodiments may be implemented in hardware or in software. The implementation can be performed using a digital storage medium, for example, a floppy disk, a DVD, a Blu-Ray disc, a CD, a ROM, a PROM, an EPROM, an EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field-programmable gate array (FPGA) having a microprocessor.

The digital storage medium may therefore be machine- or computer-readable. Some exemplary embodiments thus comprise a data storage medium that has electronically readable control signals that are capable of interacting with a programmable computer system or a programmable hardware component such that one of the methods described herein is performed. At least one exemplary embodiment is, therefore, a data storage medium (or a digital storage medium or a computer-readable medium) on which the program for performing one of the methods described herein is recorded.

In general, exemplary embodiments may be implemented as a program, firmware, a computer program or computer program product having a program code or as data, the program code or the data being active to perform one of the methods when the program runs on a processor or a programmable hardware component. By way of example, the program code or the data may also be stored on a machine-readable medium or data storage medium. The program code or the data may be present as source code, machine code or bytecode and as other intermediate code, inter alia.

A further exemplary embodiment is further a data stream, a signal train or a sequence of signals that represent(s) the program for performing one of the methods described herein. By way of example, the data stream, the signal train or the sequence of signals may be configured to be transferred via a data communication link, for example, via the Internet or another network. Exemplary embodiments are thus also data-representing signal trains that are suitable for transmission via a network or a data communication link, the data being the program.

A program according to at least one exemplary embodiment can implement one of the methods during performance thereof, for example, by reading memory locations or writing a datum or multiple data thereto, which possibly prompts switching processes or other processes in transistor structures, in amplifier structures or in other electrical, optical or magnetic components or components operating on another functional principle. Accordingly, data, values, sensor values or other information can be captured, determined or measured by a program by reading a memory location. A program can therefore capture, determine or measure variables, values, measured variables and other information by reading one or more memory locations, and can prompt, bring about or perform an action and actuate other devices, machines and components by writing to one or more memory locations.

The exemplary embodiments described above are merely an illustration of the principles. It goes without saying that modifications and variations of the arrangements and details described herein will be apparent to other persons skilled in the art. Therefore, the intention is for the disclosed embodiments to be limited merely by the scope of protection of the patent claims below rather than by the specific details that have been presented herein on the basis of the description and the explanation of the exemplary embodiments.

LIST OF REFERENCE SYMBOLS

10 Apparatus
12 Transceiver module
14 Control module
16 Further transceiver module
18 Diplexer 22 Combination
24 Processing
100 Vehicle
110 Interior antenna
120 Exterior antenna
2002 External access point
2004 Mobile terminal
2006 Connection to external access point 2002 via 2.4 GHz frequency band
2008 Provision of access point in the 2.4 GHz frequency band
3002 Mobile terminals
3004 5 GHz frequency band
3006 2.4 GHz frequency band
4002 Switch
4004 Interior antenna
4006 Exterior antenna
4008 Transceiver module
4008a First submodule
4008a1 Access control module
4008a2 Transceiver component
4008a3 Transceiver component
4008b Second submodule
4008b1 Access control module
4008b2 Transceiver component
4008b3 Transceiver component
4010 Diplexer
5004 Interior antenna
5006 Exterior antenna
5008 Transceiver module
5008a First submodule
5008a1 Access control module
5008a2 Transceiver component
5008a3 Transceiver component
5008b Second submodule
5008b1 Access control module
5008b2 Transceiver component
5008b3 Transceiver component
5010a Diplexer
5010b Diplexer
5012 Mobile terminal
5014 Mobile access point
5016 Access point
5018 Mobile terminal
5022 2.4 GHz user signal component
5024 2.4 GHz access point signal component
5026 5 GHz access point signal component
5028 5 GHz user signal component

The invention claimed is:

1. An apparatus for a vehicle, the vehicle comprising at least one interior antenna and at least one exterior antenna, the apparatus comprising:
a transceiver module for communication via a frequency band; and
a control module that controls the transceiver module and provides signal processing for the transceiver module for signals from the at least one interior antenna and the at least one exterior antenna based on a combination of the signals from the at least one interior antenna and the at least one exterior antenna.

2. The apparatus of claim 1, further comprising a further transceiver module for communication via a further frequency band, which is different than the frequency band of the transceiver module, wherein the control module provides further signal processing for the further transceiver module for signals from the at least one interior antenna and the at least one exterior antenna based on a combination of the signals from the at least one interior antenna and the at least one exterior antenna.

3. The apparatus of claim 2, further comprising at least one diplexer to separate frequency components of the frequency band and of the further frequency band for the signal processing of the signals.

4. The apparatus of claim 1, wherein the control module provides the signal processing as maximum ratio combining, or wherein the control module provides the signal processing as selection of the stronger signal of the signals from the at least one interior antenna and the at least one exterior antenna.

5. The apparatus of claim 1, further comprising one or more matched filters for filtering the signals prior to the signal processing.

6. The apparatus of claim 5, wherein the one or more matched filters comprise at least one element from the group comprising signal-matched filter, channel-matched filter, and signal- and channel-matched filter.

7. The apparatus of claim 1, wherein the signal processing is based on autocorrelation functions of the signals.

8. The apparatus of claim 1, wherein the transceiver module communicates via the interior antenna and via the exterior antenna at the same time.

9. The apparatus of claim 1, wherein the control module determines a useful signal from a communication partner in the received signals,
wherein the control module determines whether a signal component of the useful signal from the interior antenna or a signal component of the useful signal from the exterior antenna is predominant, and
wherein the control module takes the signal components as a basis for providing an output signal for the communication partner via the transceiver module via the interior antenna or the exterior antenna.

10. The apparatus of claim 1, wherein the control module uses the transceiver module to form a rake receiver.

11. A method for a vehicle, the vehicle comprising at least one interior antenna and at least one exterior antenna, the method comprising:
combining the signals from the at least one interior antenna and the at least one exterior antenna; and
processing the combination of the signals from the at least one interior antenna and the at least one exterior antenna for subsequent transmission by a transceiver module via a frequency band.

12. The method of claim 11, further comprising further signal processing signals from the at least one interior antenna and the at least one exterior antenna based on a combination of the signals from the at least one interior antenna and the at least one exterior antenna by a further transceiver module for communication via a further frequency band, which is different than the frequency band of the transceiver module.

13. The method of claim 12, further comprising separating frequency components of the frequency band and of the further frequency band for the signal processing of the signals using at least one diplexer.

14. The method of claim 11, wherein signal processing is performed as maximum ratio combining, or selection of the stronger signal of the signals from the at least one interior antenna and the at least one exterior antenna.

15. The method of claim 1, further comprising filtering the signals prior to the signal processing using one or more matched filters.

16. The method of claim 15, wherein the one or more matched filters comprise at least one element from the group comprising signal-matched filter, channel-matched filter, and signal- and channel-matched filter.

17. The method of claim 11, wherein the signal processing is based on autocorrelation functions of the signals.

18. The method of claim 17, wherein the transceiver module communicates via the interior antenna and via the exterior antenna at the same time.

19. The method of claim 11, further comprising determining a useful signal from a communication partner in the received signals, determining whether a signal component of the useful signal from the interior antenna or a signal component of the useful signal from the exterior antenna is predominant, and taking the signal components as a basis for providing an output signal for the communication partner via the transceiver module via the interior antenna or the exterior antenna.

20. One or more non-transitory, machine-readable storage media comprising a plurality of instructions stored thereon that, when executed, causes an apparatus to:

combine the signals from the at least one interior antenna and the at least one exterior antenna; and process the combination of the signals from the at least one interior antenna and the at least one exterior antenna.

21. The one or more non-transitory, machine-readable storage media of method of claim 20, wherein the method further comprises further signal processing signals from the at least one interior antenna and the at least one exterior antenna based on a combination of the signals from the at least one interior antenna and the at least one exterior antenna by a further transceiver module for communication via a further frequency band, which is different than the frequency band of the transceiver module.

22. The one or more non-transitory, machine-readable storage media of method of claim 20, wherein the method further comprises separating frequency components of the frequency band and of the further frequency band for the signal processing of the signals using at least one diplexer.

23. The one or more non-transitory, machine-readable storage media of method of claim 20, wherein signal processing is performed as maximum ratio combining, or selection of the stronger signal of the signals from the at least one interior antenna and the at least one exterior antenna.

24. The one or more non-transitory, machine-readable storage media of method of claim 20, wherein the method further comprises filtering the signals prior to the signal processing using one or more matched filters.

25. The one or more non-transitory, machine-readable storage media of method of claim 24, wherein the one or more matched filters comprise at least one element from the group comprising signal-matched filter, channel-matched filter, and signal- and channel-matched filter.

26. The one or more non-transitory, machine-readable storage media of method of claim 20, wherein the signal processing is based on autocorrelation functions of the signals.

27. The one or more non-transitory, machine-readable storage media of method of claim 26, wherein the transceiver module communicates via the interior antenna and via the exterior antenna at the same time.

28. The one or more non-transitory, machine-readable storage media of method of claim 20, wherein the method further comprises determining a useful signal from a communication partner in the received signals, determining whether a signal component of the useful signal from the interior antenna or a signal component of the useful signal from the exterior antenna is predominant, and taking the signal components as a basis for providing an output signal for the communication partner via the transceiver module via the interior antenna or the exterior antenna.

* * * * *